United States Patent [19]

Moini

[11] Patent Number: 5,346,685
[45] Date of Patent: Sep. 13, 1994

[54] SYNTHETIC POROUS CRYSTALLINE MCM-51, ITS SYNTHESIS AND USE

[75] Inventor: Ahmad Moini, Lawrenceville, N.J.

[73] Assignee: Mobil Oil Corp., Fairfax, Va.

[21] Appl. No.: 51,714

[22] Filed: Apr. 23, 1993

[51] Int. Cl.$^5$ .................. C01B 15/16; B01J 27/16
[52] U.S. Cl. ................... 423/718; 423/703; 423/704; 423/705; 423/DIG. 30; 502/208
[58] Field of Search ......... 423/703, 704, 705, 718, 423/DIG. 30; 502/208

[56] References Cited

U.S. PATENT DOCUMENTS

| | | | |
|---|---|---|---|
| 3,801,704 | 4/1974 | Kobayashi et al. | 423/309 |
| 4,310,440 | 1/1982 | Wilson et al. | 502/208 |
| 4,385,994 | 5/1983 | Wilson et al. | 210/689 |
| 4,440,871 | 7/1982 | Lok et al. | 502/214 |
| 4,500,651 | 2/1985 | Lok et al. | 502/208 |
| 4,705,768 | 11/1987 | Coombs et al. | 502/208 X |
| 4,713,227 | 12/1987 | Derovane et al. | 502/208 X |
| 4,793,984 | 12/1988 | Lok et al. | 423/DIG. 30 X |
| 4,880,611 | 11/1989 | von Ballmoos et al. | 423/718 |
| 4,913,795 | 4/1990 | Valyocsik | 502/208 X |
| 5,141,729 | 8/1992 | Chang et al. | 423/718 X |

FOREIGN PATENT DOCUMENTS

| | | | |
|---|---|---|---|
| 1242180 | 9/1988 | Canada | 502/208 |
| 1119507 | 11/1989 | Japan | 502/208 |

OTHER PUBLICATIONS d'Yvoire, F., "Study of Aluminum Phosphate and Trivalent Iron," Memoir Presented to the Chemical Society, vol. 392, rec'd Jul. 6, 1961, pp. 1762-1776.

Alberti, G. et al., "Crystalline Insoluble Salts of Polybasic Metals-I," J. Inorg. nucl. Chem., 29, 571-578 (1967) (no month).

Clearfield, A., "Inorganic Ion Exchange Materials", CRC Press, Inc., 75-109 (1982) (no month).

Hagman, K., et al., "The Crystal Structure of NaMe$_2^{iv}$ (PO$_4$)$_3$; Me$^{iv}$=Ge, Ti, Zr", Acta Chemica Scandinavica, 22, 1822-1832 (1968) (no month).

Szostak, R. et al., "Ultralarge Pore Molecular Sieves: Characterization of the 14 Å Pore Mineral, Cacoxenite." Zeolites: Facts, Figures, Future, 439-446 (1989) (no month).

Moore, P. B. et al., "An X-ray structural study of cacoxenite, a mineral phosphate," Nature, 306, No. 5941, 356-358 (1983) (no month).

*Primary Examiner*—Karl Group
*Assistant Examiner*—David R. Sample
*Attorney, Agent, or Firm*—Alexander J. McKillop; Malcolm D. Keen; Dennis P. Santini

[57] ABSTRACT

This invention relates to a new synthetic porous crystalline titanium phosphate material, a method for its preparation and use thereof in catalytic conversion of organic compounds. The new crystalline material exhibits a distinctive X-ray diffraction pattern.

17 Claims, 1 Drawing Sheet

DEGREES TWO-THETA

DEGREES TWO-THETA

SYNTHETIC POROUS CRYSTALLINE MCM-51, ITS SYNTHESIS AND USE

BACKGROUND OF THE INVENTION

1. Field of the Invention

This invention relates to a novel composition of synthetic porous crystalline titanium phosphate material, to a method for its preparation and to its use as a catalyst component in catalytic conversion of organic compounds.

2. Description of the Prior Art

Porous inorganic solids have found great utility as catalysts and separations media for industrial application. The openness of their microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "X-ray indifferent". The microstructure of the silicas consists of 100–250 Angstrom particles of dense amorphous silica (*Kirk-Othmer Encyclopedia of Chemical Technology*, 3rd Edition, Vol. 20, John Wiley & Sons, New York, p. 766–781, 1982), with the porosity resulting from voids between the particles. Since there is no long range order in these materials, the pores tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum" Technical Paper No 19 Revised, Alcoa Research Laboratories, p. 54–59, 1987). Since, in the case of either material, there is no long range order controlling the sizes of pores in the material, the variability in pore size is typically quite high.

In sharp contrast to these structurally ill-defined solids are materials whose pore size distribution is very narrow because it is controlled by the precisely repeating crystalline nature of the materials' microstructure. These materials are called "molecular sieves", the most notable examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g., $AlO_4$, in which the tetrahedra are cross-linked by the sharing of oxygen atoms whereby the ratio of the total Group IIIB element, e.g., aluminum, and Group IVB element, e.g., silicon, atoms to oxygen atoms is 1:2. The electrovalence of the tetrahedra containing the Group IIIB element, e.g., aluminum, is balanced by the inclusion in the crystal of a cation, for example, an alkali metal or an alkaline earth metal cation. This can be expressed wherein the ratio of the Group IIIB element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms is the "$H_1$" phase or hydrate of aluminum phosphate of F.d'Yvoire, *Memoir Presented to the Chemical Society*, No. 392, "Study of Aluminum Phosphate and Trivalent Iron", Jul. 6, 1961 (received), pp. 1762–1776. This material, when crystalline, is identified by the JCPDS International Center for Diffraction Data card number 15-274. Once heated at about 110° C., however, the d'Yvoire material becomes amorphous or transforms to the aluminophosphate form of tridymite.

Compositions comprising crystals having a framework topology after heating at 110° C. or higher giving an X-ray diffraction pattern consistent with a material having pore windows formed by 18 tetrahedral members of about 12–13 Angstroms in diameter are taught in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356–358 (1983) to have a framework structure containing very large channels with a calculated free pore diameter of 14.2 Angstroms. R. Szostak et al., *Zeolites: Facts, Figures, Future,* Elsevier Science Publishers B.V., 1989, present work showing cacoxenite as being very hydrophilic, i.e., adsorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e., silicoaluminophosphates of particular structures are taught in U.S. Pat. Nos. 3,355,246 (i.e., ZK-21) and 3,791,964 (i.e., ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5); and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

Titanium phosphate materials and methods for their synthesis are taught in Clearfield, A., ed., *Inorganic Ion Exchange Materials*, CRC Press, 76–109 (1982). A three-dimensional, or crystalline, phase of titanium phosphate having the formula $NaTi_2(PO_4)_3$ is taught in Hagman, L. et al., *Acta Chem. Scand.*, 22, 1822–32 (1968).

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Synthesis of a layered titanium phosphate having the formula $Ti(HPO_4)_2 \cdot H_2O$ is taught in Clearfield, A., ed., *Inorganic Ion Exchange Materials*, CRC Press (1982). This material and its synthesis are discussed in Alberti, G. et al., *J. Inorg. Nucl. Chem.*, 29, 571 (1967).

Once a layered material is swollen, the material may be pillared by interposing a thermally stable substance, such as silica, between the spaced apart layers. Patents teaching pillaring of layered materials and the pillared products include U.S. Pat. Nos. 4,216,188; 4,248,739; 4,176,090; and 4,367,163; and European Patent Application 205,711.

SUMMARY OF THE INVENTION

The present invention is directed to a novel composition of a porous crystalline titanium phosphate material, named MCM-51, a method for its preparation, and the conversion of organic compounds contacted with catalyst comprising same. MCM-51 is synthesized under hydrothermal conditions by a new synthesis procedure. It exhibits a high surface area in addition to significant sorption capacity for both hydrocarbons and water.

DESCRIPTION OF SPECIFIC EMBODIMENTS

Figure 1:
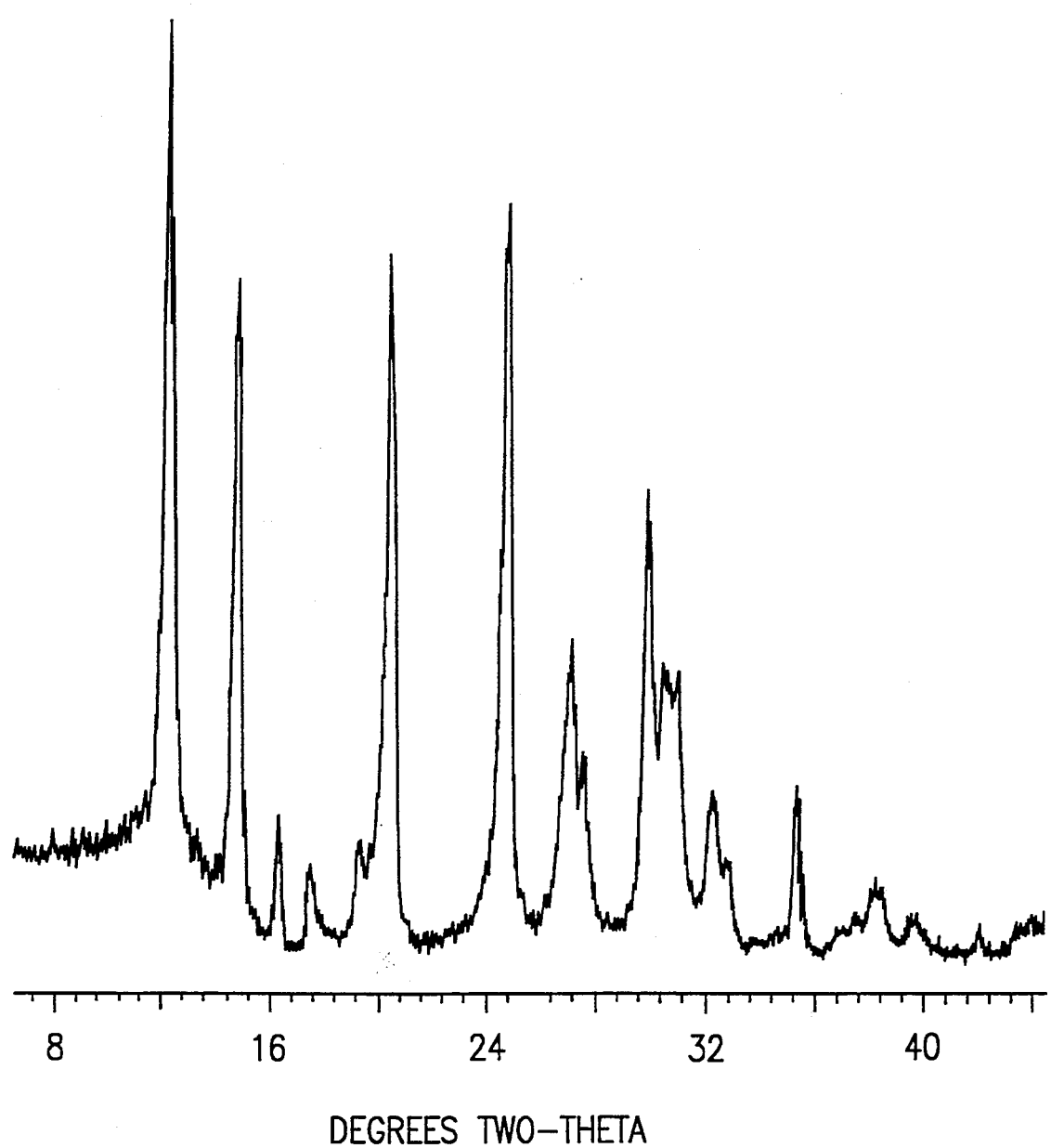
FIG. 1 is the X-ray diffraction pattern of the MCM-51 product of Example 1.

The crystalline titanium phosphate MCM-51 material of this invention has a composition involving the molar relationship:

$$TiO_2:(0.5\pm0.1)P_2O_5.$$

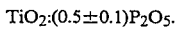

The MCM-51 contains essentially equimolar amounts of Ti and P per formula unit. It will be understood that this ratio formula and the formula below are provided as a general guideline, and that the actual material may have a slightly different stoichiometry to result in an oxide, e.g., $Ti(PO_4)_{1.33}$, which could be represented as $Ti_3(PO_4)_4$, or an oxide-hydroxide, e.g., $Ti(PO_4)(OH)$, or an intermediate phase between these two end-members. Therefore, it is useful to simply list the $TiO_2/P_2O_5$ ratio, and include a range. In the as-synthesized form, MCM-51 has a formula involving the molar relationship:

$$TiO_2:(0.5\pm0.1)P_2O_5:xH_2O:yR$$

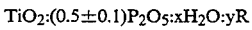

wherein x is from 0 to about 0.1, y is from 0 to about 0.1, and R is an organic moiety associated with the material as a result of its presence during synthesis and is easily removed by post-synthesis methods hereinafter more particularly described.

The crystalline material of the invention is thermally stable and in the calcined form exhibits high surface area (greater than about 50 m²/g) and unusually large sorption capacity when compared to previously known transition metal, e.g., zirconium, titanium or vanadium, phosphate materials.

In the as-synthesized form, the crystalline MCM-51 material of the invention appears to be a single crystalline phase. It can be prepared in essentially pure form with little or no detectable impurity crystal, amorphous or layered phases and has an X-ray diffraction pattern which is distinguished from the patterns of other known as-synthesized or thermally treated crystalline materials by the lines listed in Table I below:

TABLE I

| Interplanar d-Spacing (A) | Relative Intensity, $I/I_o \times 100$ |
|---|---|
| 7.17 ± 0.2 | vs |
| 6.01 ± 0.1 | vs |
| 4.37 ± 0.08 | vs |
| 3.62 ± 0.07 | vs |
| 3.32 ± 0.07 | s |
| 3.27 ± 0.06 | w |
| 3.01 ± 0.06 | m–s |
| 2.95 ± 0.06 | s–vs |
| 2.76 ± 0.05 | w |
| 2.56 ± 0.04 | w |

In its calcined form, the crystalline MCM-51 titanium phosphate material of the invention has an X-ray diffraction pattern which is virtually unchanged from that of the as-synthesized material.

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units (A), and the relative intensities of the lines, above background, were derived with the use of a profile fitting routine (or second derivative algorithm). The intensities are uncorrected for Lorentz and polarization effects. The relative intensities are given in terms of the symbols vs=very strong (60–100), s=strong (40–60), m=medium (20–40) and w=weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, and thermal and/or hydrothermal history. Other changes in diffraction patterns can be indicative of important differences between materials.

When used as a catalyst or catalyst support, the crystalline titanium phosphate material of the invention may be subjected to treatment to remove part or all of any organic constituent. The crystalline MCM-51 material can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into a composition comprising MCM-51, impregnated therein or intimately physically admixed therewith. Such component can be impregnated in or on to a composition comprising MCM-51 such as, for example, by, in the case of platinum, treating the composition with a solution containing a platinum metal-containing ion. Thus, suitable platinum compounds for this purpose include chloroplatinic acid, platinous chloride and various compounds containing the platinum amine complex.

MCM-51 may be subjected to thermal treatment which is generally performed by heating at a temperature of at least about 250° C. for at least 1 minute and generally not longer than 20 hours. While subatmospheric pressure can be employed for the thermal treatment, atmospheric pressure is desired for reasons of convenience. The thermal treatment can be performed at a temperature up to about 500° C. The thermally treated product, especially in combination with supported metals and metal oxides, is particularly useful in the catalysis of certain organic, e.g., hydrocarbon, conversion reactions. Non-limiting examples of such reactions include isomerization, olefin hydrogenation, and olefin polymerization.

The crystalline titanium phosphate material of this invention, when employed either as an adsorbent or as a catalyst in an organic compound conversion process should be dehydrated, at least partially. This can be done by heating to a temperature in the range of 200° C. to about 370° C. in an atmosphere such as air, nitrogen, etc. and at atmospheric, subatmospheric or superatmospheric pressures for between 30 minutes and 48 hours. Dehydration can also be performed at room temperature merely by placing the MCM-51 in a vacuum, but a longer time is required to obtain a sufficient amount of dehydration.

The present crystalline titanium phosphate material can be prepared from a reaction mixture containing sources of titanium (Ti), phosphorus (P), directing agent (R), and solvent or solvent mixture, such as, for example, $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| P/Ti | 2 to 30 | 10 to 20 |
| solvent/Ti | 20 to 150 | 70 to 110 |
| R/Ti | 0.2 to 10 | 3.0 to 7.0 |

Sources of titanium for use herein include, for example, titanium oxide, titanium ethoxide, titanium isopropoxide, titanium propoxide, titanium diisopropoxide bis (2,4-pentanedionate), and combinations thereof.

Sources of phosphorus for use in the present synthesis include, for example, phosphoric acid, triethylphosphate, and combination thereof.

Directing agent R for use herein comprises quaternary alkylammonium ions, alkyl comprising from 2 to 4 carbon atoms and combinations thereof. Non-limiting examples of sources of R include hydroxide and halide (e.g., chloride and bromide) salts of tetrapropylammonium, tetrapropylphosphonium, and mixtures thereof.

In this method for synthesis of MCM-51, the reaction mixture concentration of organic directing agent R is critical and must be within the range of from about 0.2M to about 2.0M, preferably within the range of from about 0.8M to about 1.5M. The synthesis method involving the above required reaction mixture components follows the steps:

(1) mixing a source of titanium with appropriate solvent or solvent mixture;

(2) allowing the mixture of step (1) to proceed through a controlled hydrolysis process resulting in a titanium oxide final product;

(3) mixing the titanium oxide product of step (2) with appropriate amounts of a source of phosphorus and the organic directing agent;

(4) placing the mixture resulting from step (3) in a sealed vessel and heating at the appropriate temperature within the range of from about 80° C. to about 225° C. for a fixed period of time, usually from about 24 hours to about 60 days; and (5) recovering the final solid product by filtering, washing, and drying.

Crystallization of the present crystalline titanium phosphate material can be carried out at either static or stirred conditions in a suitable reactor vessel, such as for example, polypropylene jars or teflon lined or stainless steel autoclaves. The total useful range of temperatures for crystallization is from about 80° C. to about 225° C, for a time sufficient for crystallization to occur at the temperature used, e.g., from about 24 hours to about 60 days. Thereafter, the crystals are separated from the liquid and recovered.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

Synthesis of the new crystals may be facilitated by the presence of at least 0.01 percent, preferably 0.10 percent and still more preferably 1 percent, seed crystals (based on total weight) of crystalline product. Useful seed crystals include MCM-51.

The titanium phosphate crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The crystalline material of this invention can be used to catalyze a variety of chemical conversion processes including many of present commercial/industrial importance. Examples of chemical conversion processes which may utilize catalyst comprising MCM-51, either as an active component or matrix, by itself or in combination with one or more other catalytically active substances including other crystalline catalysts, include those requiring a catalyst with acid activity.

Employing a catalytically active form of the composition of this invention containing a hydrogenation component, reforming stocks can be reformed employing a temperature of from about 450° C. to about 550° C. The pressure can be from about 50 psig to about 500 psig, but is preferably between about 100 psig and 300 psig. The liquid hourly space velocity is generally from about 0.1 $hr^{-1}$ to about 10 $hr^{-1}$ preferably between about 1 $hr^{-1}$ and 4 $hr^{-1}$, and the hydrogen to hydrocarbon mole ratio is generally from about 1 to about 10, preferably between about 3 and 5.

An MCM-51 catalyst can also be used for hydroisomerization of normal paraffins when provided with a hydrogenation component, e.g., platinum. Hydroisomerization is carried out at a temperature of from 250° C. to about 450° C., preferably from about 300° C. to about 425° C., with a liquid hourly space velocity from about 0.1 $hr^{-1}$ to about 10 $hr^{-1}$, preferably between about 0.5 $hr^{-1}$ and 4 $hr^{-1}$, employing hydrogen such that the hydrogen to hydrocarbon mole ratio is from about 1 to about 10.

Additionally, the MCM-51 catalyst can be used for olefin or aromatics isomerization employing a temperature of from about 0° C. to about 550° C.

The MCM-51 catalyst can also be used for reducing the pour point of gas oils. This process is carried out at a liquid hourly space velocity of from about 0.1 $hr^{-1}$ to about 5 $hr^{-1}$, and a temperature of from about 300° C. to about 425° C.

Other reactions which can be accomplished employing an MCM-51 catalyst containing a metal, e.g., platinum, include hydrogenation-dehydrogenation reactions and desulfurization reactions, olefin polymerization (oligomerization), and other organic compound conversions such as the conversion of alcohols, e.g., methanol, to hydrocarbons.

In the case of many catalysts, it is desired to incorporate the new MCM-51 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new MCM-51 crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the new MCM-51 crystal can be composited with a porous matrix material such as silica-alumina, silica-magnesia, silica-zirconia, silica-thoria, silica-beryllia, silica-titania as well as ternary compositions such as silica-aluminathoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following specific example is presented. In the example, sorption data are set forth for comparison of sorptive capacities for water, cyclohexane and n-hexane. Equilibrium Adsorption values were determined as follows:

A weighed sample of the calcined adsorbant was contacted with the desired pure adsorbate vapor in an adsorption chamber, evacuated to less than 1 mm and contacted with 12 Torr of water vapor and 40 Torr of n-hexane or cyclohexane vapor, pressures less than the vapor-liquid equilibrium pressure of the respective adsorbate at 90° C. The pressure was kept constant (within about ±0.5 mm) by addition of adsorbate vapor controlled by a manostat during the adsorption period, which did not exceed about 8 hours. As adsorbate was adsorbed by the new crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant. The new synthetic titanium phosphate material of this invention always exhibits Equilibrium Adsorption values of greater than about 4.0 wt. % for water vapor, greater than about 3.5 wt. % for cyclohexane vapor and greater than about 3.5 wt. % for n-hexane vapor. These vapor sorption capacities are a notable distinguishing feature of the present crystalline MCM-51 material.

Percentages in the example are by weight unless otherwise indicated.

EXAMPLE

Titanium diisopropoxide (2,4-pentanedionate) (170 g, 75% in 2-propanol) was added to 700 g ethanol. To this mixture was added 135 g water in a dropwise fashion. The resulting solution was allowed to stir while exposed to the ambient atmosphere. This titania sol was allowed to hydrolyze and form a solid gel.

A portion of this amorphous titania gel (2.6 g corresponding to about 1.2 g $TiO_2$) was mixed with 16.2 mL $H_3PO_4$ (85% solution) and 40.6 g of tetrapropylammonium hydroxide (40% solution). The resulting mixture was loaded into a Teflon-lined Parr bomb (120 mL capacity), and the bomb was placed in an oven at 200° C. The reaction was stopped after about 48 hours. The product was filtered and washed with large amounts of distilled deionized water.

The elemental analysis for this product showed 29.12% Ti, 18.70% P, and 1.05% C. The X-ray diffraction pattern for the product is shown in FIG. 1. The X-ray pattern remained virtually unchanged after calcination (300° C. in air for 4 hours) of the product, and is shown in Table II. The sorption capacities for this product were as follows: 4.9% n-hexane, 5.3% cyclohexane, and 6.4% $H_2O$.

TABLE II

| Degrees 2-Theta | Interplanar d-spacing (A) | $I/I_o$ |
|---|---|---|
| 12.339 | 7.173 | 100.0 |
| 14.745 | 6.007 | 71.0 |
| 16.099 | 5.505 | 8.9 |
| 16.353 | 5.420 | 2.4 |
| 19.088 | 4.649 | 5.6 |
| 19.238 | 4.613 | 2.4 |
| 20.307 | 4.373 | 69.4 |
| 22.780 | 3.904 | 1.6 |
| 24.577 | 3.622 | 94.4 |
| 26.815 | 3.325 | 55.6 |
| 27.303 | 3.266 | 12.9 |
| 29.716 | 3.006 | 40.3 |
| 30.287 | 2.9509 | 60.5 |
| 30.593 | 2.9221 | 24.2* |
| 30.138 | 2.7851 | 10.5 |
| 32.481 | 2.7565 | 15.3 |
| 34.553 | 2.5957 | 4.8 |
| 35.030 | 2.5615 | 16.1 |
| 36 752 | 2.4453 | 6.5 |
| 37.692 | 2.3865 | 6.5 |
| 38.435 | 2.3420 | 6.5 |
| 39.268 | 2.2943 | 4.8 |
| 40.792 | 2.2120 | 1.6 |
| 41.660 | 2.1679 | 2.4 |
| 43.706 | 2.0710 | 0.8 |
| 44.196 | 2.0492 | 2.4 |
| 44.997 | 2.0145 | 16.9 |
| 45.593 | 1.9896 | 11.3 |
| 46.604 | 1.9488 | 1.5 |
| 47.244 | 1.9238 | 8.1 |
| 48.461 | 1.8783 | 3.2 |
| 49.017 | 1.8583 | 5.6 |

*Shoulder on previous peak.

What is claimed is:

1. A synthetic porous crystalline material characterized by an X-ray diffraction pattern including values substantially as set forth in Table I of the specification and having a composition in terms of $TiO_2$ and $P_2O_5$ comprising the molar relationship:

$TiO_2:(0.5\pm0.1)P_2O_5$.

2. The crystalline material of claim 1 having a composition expressed by the molar relationship:

$TiO_2:(0.5\pm0.1)P_2O_5:xH_2O:yR$, wherein x is from 0 to about 0.1, y is from 0 to about 0.1, and R is an organic moiety.

3. The crystalline material of claim 2 wherein said R is selected from the group consisting of quaternary alkylammonium ions, alkyl comprising from 2 to 4 carbon atoms, and mixtures thereof.

4. The crystalline material of claim 1 which has a surface area of greater than about 50 m²/g.

5. The crystalline material of claim 1 which exhibits Equilibrium Adsorption values of greater than about 4.0 wt. % for water vapor, greater than about 3.5 wt. % for cyclohexane vapor, and greater than about 3.5 wt. % for n-hexane vapor.

6. A composition comprising the crystalline material of claim 1 and a matrix.

7. The composition of claim 6 wherein said matrix comprises alumina, silica, zirconia, titania, magnesia, beryllia or a combination thereof.

8. A synthetic porous crystalline material having an X-ray diffraction pattern substantially as shown in FIG. 1 and having a composition in terms of $TiO_2$ and $P_2O_5$ comprising the molar relationship $TiO_2:(0.5\pm0.1)P_2O_5$.

9. A mixture capable of forming the synthetic porous crystalline material of claim 1 upon crystallization, said mixture comprising sources of titanium, phosphorus, directing agent R and solvent, and having a composition, in terms of mole ratios, within the following ranges:

| | |
|---|---|
| P/Ti | 2 to 30 |
| solvent/Ti | 20 to 150 |
| R/Ti | 0.2 to 10 | wherein R is an organic moiety selected from the group consisting of quaternary alkylammonium ions, alkyl comprising from 2 to 4 carbon atoms, and mixtures thereof.

10. The mixture of claim 9 wherein solvent is selected from the group consisting of $C_1$–$C_6$ alcohols, $C_1$–$C_6$ diols, water and mixtures thereof.

11. A method for synthesizing the porous crystalline material of claim 1 which comprises (1) mixing a source of titanium with solvent; (2) hydrolyzing the mixture of step (1) to form titanium oxide gel; (3) mixing the titanium oxide gel product of step (2) with sources of phosphorus and directing agent R to form a mixture having a composition, in terms of mole ratios, within the following ranges:

| | |
|---|---|
| P/Ti | 2 to 30 |
| solvent/Ti | 20 to 150 |
| R/Ti | 0.2 to 10 | wherein R is an organic moiety selected from the group consisting of quaternary alkylammonium ions, alkyl comprising from 2 to 4 carbon atoms, and mixtures thereof; (4) maintaining said mixture under sufficient conditions until crystals of said material are formed; and (5) recovering said crystalline material from step (4).

12. The method of claim 11 wherein said mixture has the following composition ranges:

| | |
|---|---|
| P/Ti | 10 to 20 |
| solvent/Ti | 70 to 110 |
| R/Ti | 3.0 to 7.0. |

13. The method of claim 11 wherein said source of titanium is selected from the group consisting of titanium oxide, titanium ethoxide, titanium isopropoxide, titanium propoxide, titanium diisopropoxide bis (2,4-pentanedionate), and combinations thereof.

14. The method of claim 11 wherein said source of phosphorus is selected from the group consisting of phosphoric acid, triethylphosphate, and combination thereof.

15. The method of claim 11 wherein said solvent is selected from the group consisting of $C_1$–$C_6$ alcohols, $C_1$–$C_6$ diols, water, and mixtures thereof.

16. The method of claim 11 wherein the concentration of R in the mixture of step (3) is within the range of from about 0.2M to about 2.0M.

17. The method of claim 12 wherein the concentration of R in the mixture of step (3) is within the range of from about 0.2M to about 2.0M.

* * * * *